(12) United States Patent  (10) Patent No.: US 12,227,126 B2
Hanby                     (45) Date of Patent:     Feb. 18, 2025

(54) TRUCK BOX LIGHT CONTROLLER

(71) Applicant: Michelle Hanby, Fayetteville, AR (US)

(72) Inventor: Michelle Hanby, Fayetteville, AR (US)

(*) Notice: Subject to any disclaimer, the term of this patent is extended or adjusted under 35 U.S.C. 154(b) by 0 days.

(21) Appl. No.: 18/115,592

(22) Filed: Feb. 28, 2023

(65) Prior Publication Data
US 2024/0286544 A1 Aug. 29, 2024

Related U.S. Application Data

(63) Continuation of application No. 17/188,356, filed on Mar. 1, 2021, now abandoned.

(60) Provisional application No. 62/982,870, filed on Feb. 28, 2020.

(51) Int. Cl.
B60Q 1/44 (2006.01)
B60T 17/22 (2006.01)

(52) U.S. Cl.
CPC ............ B60Q 1/44 (2013.01); B60T 17/22 (2013.01)

(58) Field of Classification Search
CPC ................................. B60Q 1/44; B60T 17/22
See application file for complete search history.

(56) References Cited

U.S. PATENT DOCUMENTS

| | | | |
|---|---|---|---|
| 4,006,453 A | 2/1977 | Bryant | 340/67 |
| 4,871,945 A | 10/1989 | Smith et al. | 315/77 |
| 6,177,865 B1 | 1/2001 | Bryant et al. | 340/431 |
| 6,720,871 B2 | 4/2004 | Boyer et al. | 340/479 |
| 6,943,677 B2 | 9/2005 | Boyer et al. | 340/479 |
| 7,242,287 B1* | 7/2007 | Giovinazzo | B60Q 1/44 340/436 |
| 9,227,675 B1* | 1/2016 | Elquest | B60P 1/64 |
| 9,908,461 B2 | 3/2018 | Gasper | 362/464 |
| 10,239,445 B1* | 3/2019 | Hendricks | H04N 9/3141 |
| 10,259,383 B1* | 4/2019 | Campbell | B60Q 1/46 |
| 11,203,286 B1* | 12/2021 | Pampattiwar | B60Q 1/305 |
| 2003/0043033 A1* | 3/2003 | Lee | B60Q 1/535 340/463 |
| 2006/0044727 A1* | 3/2006 | Aboyade | H02H 5/045 361/103 |
| 2010/0308984 A1* | 12/2010 | Ehrlich | B60Q 1/32 340/431 |
| 2013/0238205 A1* | 9/2013 | Edwards | B60T 17/02 74/108 |
| 2013/0249394 A1* | 9/2013 | Fay | F21S 41/153 315/297 |
| 2014/0354422 A1* | 12/2014 | Olson | B60Q 1/445 340/467 |
| 2017/0129550 A1* | 5/2017 | Baker | B62D 35/001 |
| 2018/0290587 A1* | 10/2018 | Fimeri | F21S 43/14 |
| 2019/0178463 A1* | 6/2019 | Ashley | B60Q 1/0088 |
| 2020/0171900 A1* | 6/2020 | Pampattiwar | H01R 13/7175 |
| 2021/0229510 A1* | 7/2021 | Balton | H04N 7/183 |

* cited by examiner

Primary Examiner — Chico A Foxx
(74) Attorney, Agent, or Firm — Keisling & Pieper PLC; David B. Pieper; Trent C. Keisling

(57) ABSTRACT

An improved straight truck braking notification system using an electrical circuit with a brake detection sensor and light controller for flashing brake lamps and alternatively or concurrently flashing one or more of the clearance lamps including the rear lower side light, rear top edge light, rear lower bottom clearance light; identification lamps including rear top center identification lamps and the rear lower license light; and/or the illumination lamp including the rear lower backup lamp.

21 Claims, 19 Drawing Sheets

TRUCK BOX LIGHT CONTROLLER

CROSS-REFERENCE TO RELATED APPLICATIONS

This application claims priority to and is a continuation-in-part of U.S. patent application Ser. No. 17/188,356, filed on Mar. 1, 2021, entitled TRAILER LIGHT CONTROLLER, which claims priority to U.S. Patent Application Ser. No. 62/982,870, filed on Feb. 28, 2020 entitled Trailer Light Controller which are both hereby incorporated by reference in its entirety.

STATEMENT REGARDING FEDERALLY SPONSORED RESEARCH OR DEVELOPMENT

Not Applicable.

REFERENCE TO A MICROFICHE APPENDIX

Not Applicable.

RESERVATION OF RIGHTS

A portion of the disclosure of this patent document contains material which is subject to intellectual property rights such as but not limited to copyright, trademark, and/or trade dress protection. The owner has no objection to the facsimile reproduction by anyone of the patent document or the patent disclosure as it appears in the Patent and Trademark Office patent files or records but otherwise reserves all rights whatsoever.

BACKGROUND OF THE INVENTION

1. Field of the Invention

The present invention relates to improvements in light modulation associated with brake actuation on a vehicle. More particularly, the invention relates to improvements particularly suited for providing braking or other notification to drivers behind straight trucks, commonly referred to as box trucks, while also providing accepted operating requirements. In particular, the present invention relates specifically to a box truck light modulator apparatus and method.

2. Description of the Known Art

As will be appreciated by those skilled in the art, pulsing or modulated brake light flashers or shunts are known in various forms. Patents disclosing information relevant to these devices include:

U.S. Pat. No. 9,908,461, issued to Gasper on Mar. 6, 2018 entitled Method and system for actuating a brake light; U.S. Pat. No. 6,943,677, issued to Boyer, et al. on Sep. 13, 2005 entitled Modulated intensity flasher for vehicle brake light with lockout; U.S. Pat. No. 6,720,871, issued to Boyer, et al. on Apr. 13, 2004 entitled Modulated intensity flasher for vehicle brake light with lockout; U.S. Pat. No. 6,177,865, issued to Bryant, et al. on Jan. 23, 2001 entitled Dual operational and brake light control for trailers; U.S. Pat. No. 4,871,945, issued to Smith, et al. on Oct. 3, 1989 entitled Automatic brake light flashing electric module and circuit; U.S. Pat. No. 4,006,453, issued to Bryant on Feb. 1, 1977 entitled Dual directional and brake light control for trailers. Each of these patents is hereby expressly incorporated by reference in their entirety.

"Straight trucks" or "box trucks" are a specific type of vehicle. The difference between a box truck and a van is that the cargo van is a one-piece unibody, while a box truck is created by adding a cargo box to a chassis cab. "Straight trucks" or "box trucks" are also known as a box van, cube van, bob truck or cube truck. These trucks are a chassis cab truck with an enclosed rectangular or square shaped cargo area. The truck frame and cabin is generally separate from the cargo area; however some box trucks do have a door between the cabin and the cargo area. Vehicle manufacturers make a conventional cab/chassis to which a separate cargo box is attached by various producers, body builders, upfitters. Types of cargo boxes include dry freight, refrigerated, platform, and dump with other custom bodies. Each of these cargo boxes has different lighting requirements unknown to the chassis cab truck vehicle manufacturer. Because the vehicle manufacturers don't know the type of end use of the chassis cab truck, they provide a basic pin out wire harness connector with basic connections. Furthermore, changing out the type of cargo box changes the lighting requirements.

Straight trucks 30 hauling boxes 20 require box lighting locations as shown in FIGS. 1 and 2. These include: Truck Front Headlamp-Lower Beam 32; Truck Front Headlamp-Upper Beam 34; Truck Front Daytime Running Lamps/Parking Lamps 36; Truck Front Left/Right Turn Signals 40; Truck Front Hazard Warning Lamps 41; Truck Front Lower Side Marker Lamps 42; Truck Front Top Edge Clearance Lamps 44; Box Front Top Center Identification Lamps 46; Box Front Top Edge Clearance Lamps 48; Box Top Intermediate Side Lamps 50;

Box Lower Intermediate Side Lamps 52; Box Rear Upper Side Edge Clearance Lamps 54; Box Rear Upper Top Edge Clearance Lamps 56; Box Rear Upper Center Identification Lamps 58; Box Rear Lower Side Edge Clearance Lamps 60; Box Rear Back-Up Lamp 62; Box Rear License Plate Lamp 64; Box Rear Lower Back Bottom Edge Clearance Lamps 66; Box Rear Left Stop/Tail/Turn/Hazard Warning Lamps 68; and Box Rear Right Stop/Tail/Turn/Hazard Warning Lamps 69.

From these prior references and the design of the prior art it may be seen that these prior art patents are very limited in their teaching and utilization, and an improved truck: box light controller is needed to overcome these limitations.

SUMMARY OF THE INVENTION

The present invention is directed to an improved straight truck braking notification system using an electrical circuit with a brake detection sensor and light controller. In accordance with one exemplary embodiment of the present invention, a control circuit is provided for flashing brake lamps and alternatively or concurrently flashing one or more of the clearance lamps including the rear lower side light, rear top edge light, rear lower bottom clearance light; identification lamps including rear top center identification lamps and the rear lower license light; and/or the illumination lamp including the rear lower backup lamp. These and other objects and advantages of the present invention, along with features of novelty appurtenant thereto, will appear or become apparent by reviewing the following detailed description of the invention.

BRIEF DESCRIPTION OF THE SEVERAL VIEWS OF THE DRAWINGS

In the following drawings, which form a part of the specification and which are to be construed in conjunction therewith, and in which like reference numerals have been employed throughout wherever possible to indicate like parts in the various views.

DETAILED DESCRIPTION OF THE INVENTION

Figure 1:
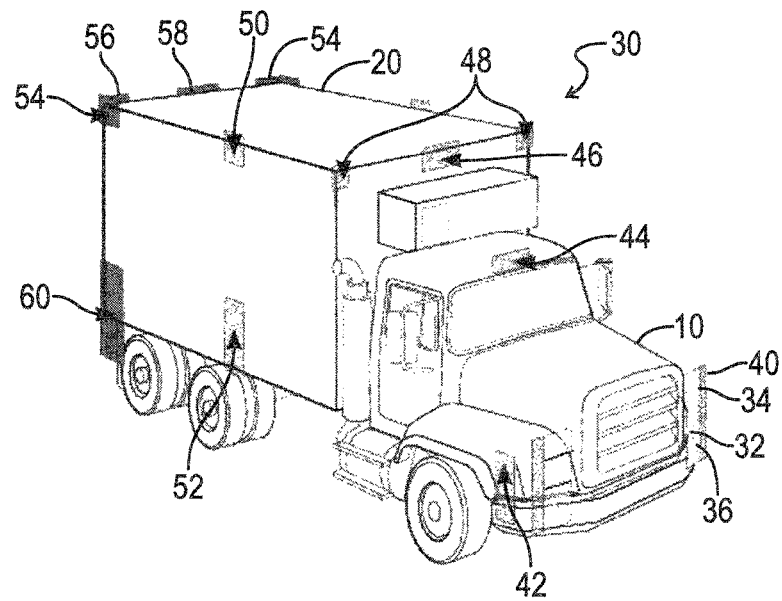
FIG. 1 is a perspective view of a straight truck lamp positioning.
Figure 2:
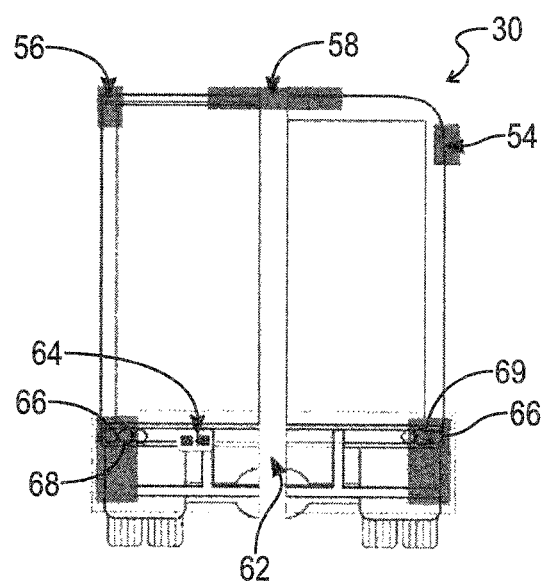
FIG. 2 is a back view of straight truck lamp positioning.

As shown in FIGS. 1 to 20 of the drawings, one exemplary embodiment of the present invention is generally shown as a straight-truck box-light controller boxtail 100 for use on a straight truck 30 with a truck 10 and box 20. The term boxtail 100 is a pigtail style of connector with an included electrical circuit for use on a box 20. The present invention utilizes an electrical flashing control circuit 400 suitable for installation in the box wiring harness 300 or installation at individual lights to provide braking indication for a straight truck 30. Changes to left/right turn/brake signal marker lights initial brake light intensity is taught with flashing between bright and dim and then returning to a continuous burn after the initial flashing, the invention also teaches the flashing of non brake lights such as identification, illumination, and clearance lights as flashing upon detection of a brake signal with a return back to their standard functions.

Figure 3:
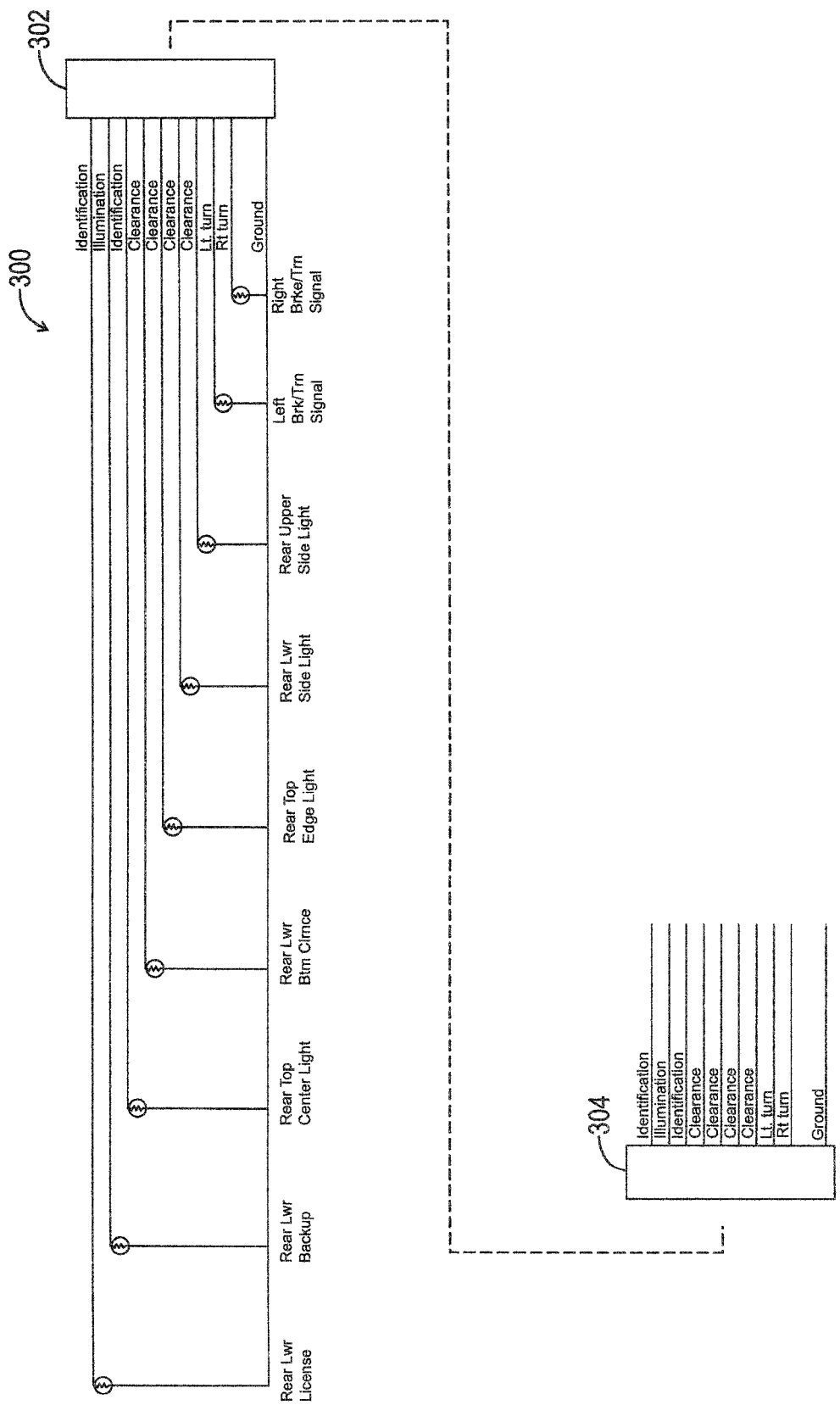
FIG. 3 is a schematic wiring diagram for a straight truck box with a ten pin wiring harness to connect to a mating ten pin wiring harness on the truck.

FIG. 3 shows a box wiring harness 300 with a ten pin box side connector 302 for connection to a ten pin truck connector 304. All of the connectors refereed to herein are pass through electrical connectors. Examples of the male and female counterparts, locks, and strain relief of the five pin connectors 312, 313, 314, 315 are:

1—Aptiv 12186400 Metri-Pack 280 Series, 5-Way Male Connector, 30 Amp Max, Item #: 38068, Manufacturer Item: 12186400, Manufacturer: Aptiv (Formerly Dephi), Aptiv Technologies Limited COMPANY BARBADOS The Financial Services Centre Bishop's Court Hill St. Michael BARBADOS BB14004.

2—Aptiv 12084891 Metri-Pack 280 Series, 5-Way Gray Female Connector, Item #: 38069, Manufacturer Item: 12084891

3—Aptiv 15324857 Metri-Pack 280 Series 5-Contact TPA Secondary Lock, Black, Item #: 38039, Manufacturer Item: 15324857

4—Aptiv 15324982 Metri-Pack 280 Series Green Cable Seal (Previously 12015323), Item #: 39000, Manufacturer Item: 15324982

For the box wiring harness 300, multiple lights are provided: clearance lamps 310 including the rear upper side light 54, rear lower side light 60, rear top edge light 56, rear lower bottom clearance light 66; identification lamps 320 including rear top center identification lamps 58 and the rear lower license light 64; and the illumination lamp 330 including the rear lower backup lamp 62.

Figure 4:
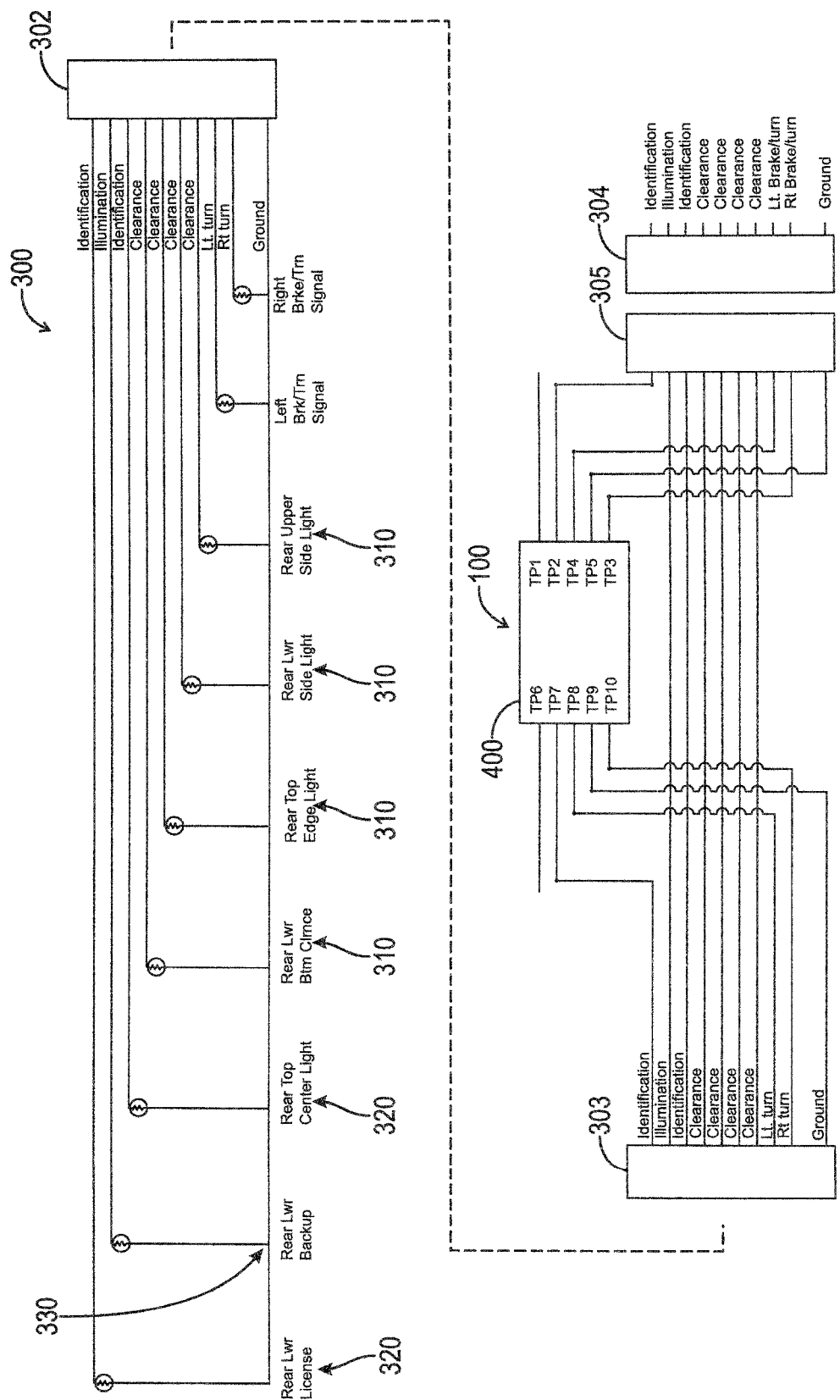
FIG. 4 shows the straight truck light controller installed in the box wiring diagram for flashing the rear lower license identification light.

FIG. 4 shows the installation of the signal controller 400 in the box wiring harness 300 for flashing the Box Rear Left Stop/Tail/Turn/Hazard Warning Lamp 68, the Box Rear Right Stop/Tail/Turn/Hazard Warning Lamps 69, and also flashing the rear lower license light 64.

Figure 5:
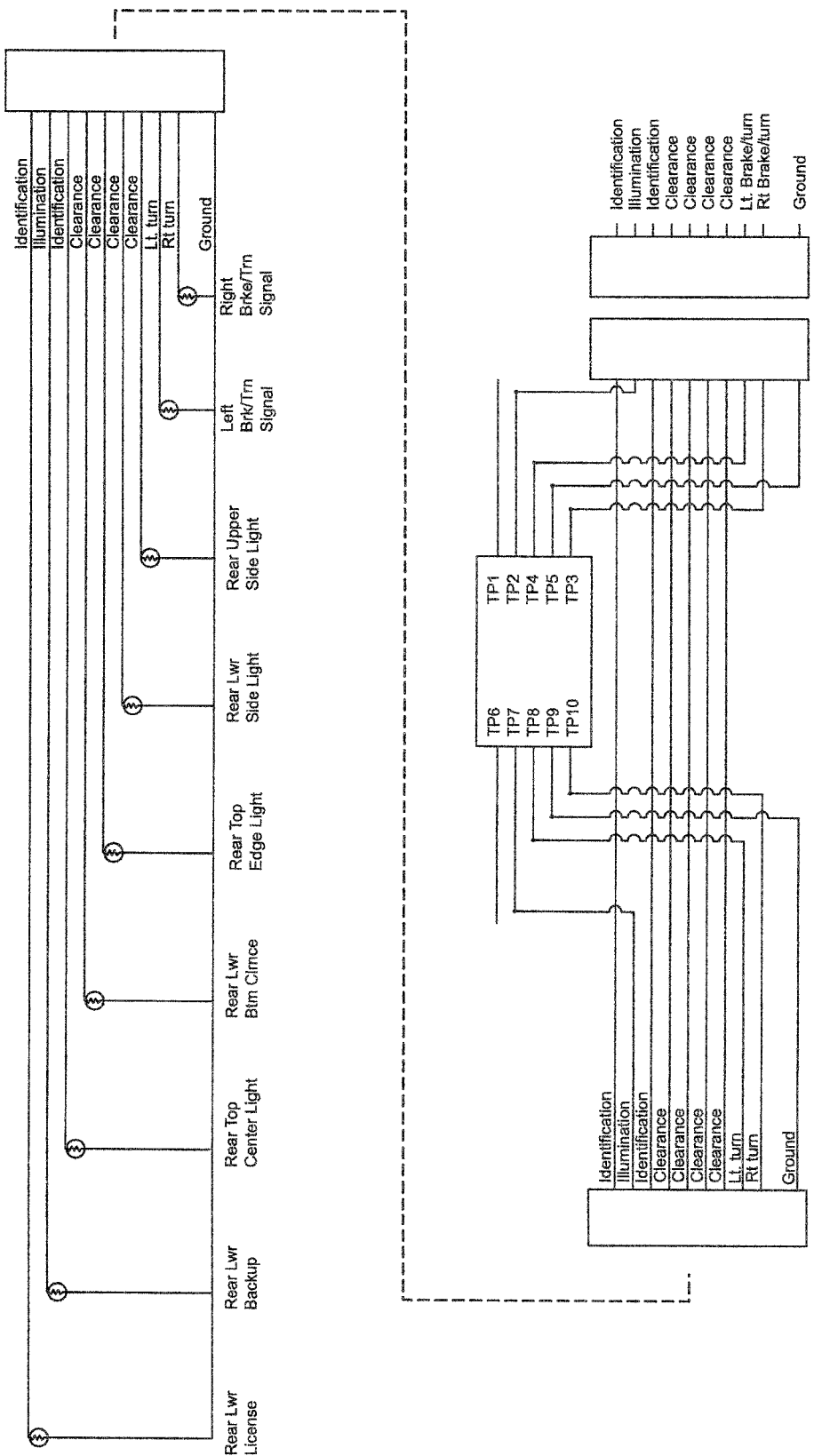
FIG. 5 shows the straight truck light controller installed in the box wiring diagram for flashing the rear lower backup illumination light.

FIG. 5 shows the installation of the signal controller 400 in the box wiring harness 300 for flashing the Box Rear Left Stop/Tail/Turn/Hazard Warning Lamp 68, the Box Rear Right Stop/Tail/Turn/Hazard Warning Lamps 69, and also flashing the rear lower backup lamp 62.

Figure 6:
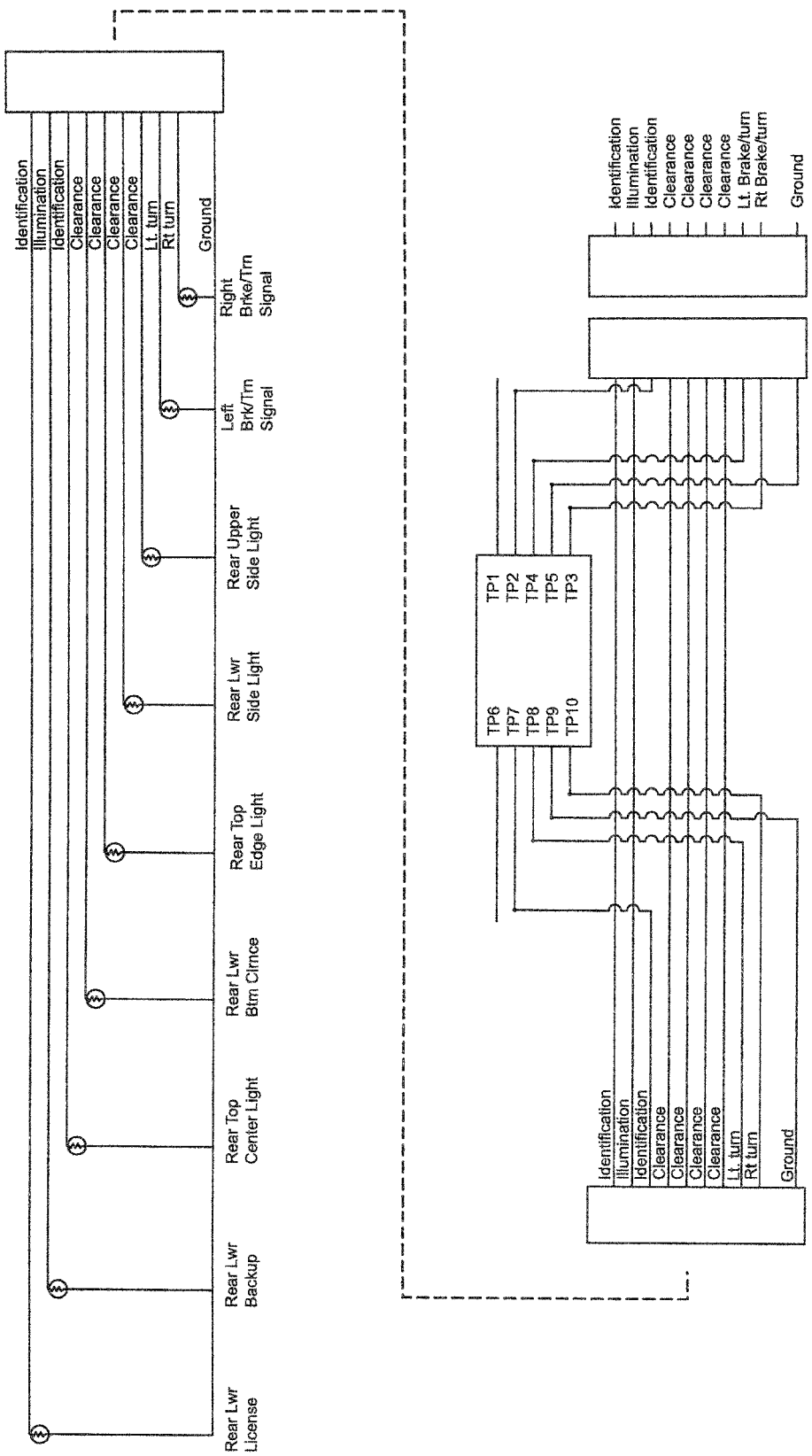
FIG. 6 shows the straight truck light controller installed in the box wiring diagram for flashing the rear top center identification light.

FIG. 6 shows the installation of the signal controller 400 in the box wiring harness 300 for flashing the Box Rear Left Stop/Tail/Turn/Hazard Warning Lamp 68, the Box Rear Right Stop/Tail/Turn/Hazard Warning Lamps 69, and also flashing the rear top center identification lamps 58.

Figure 7:
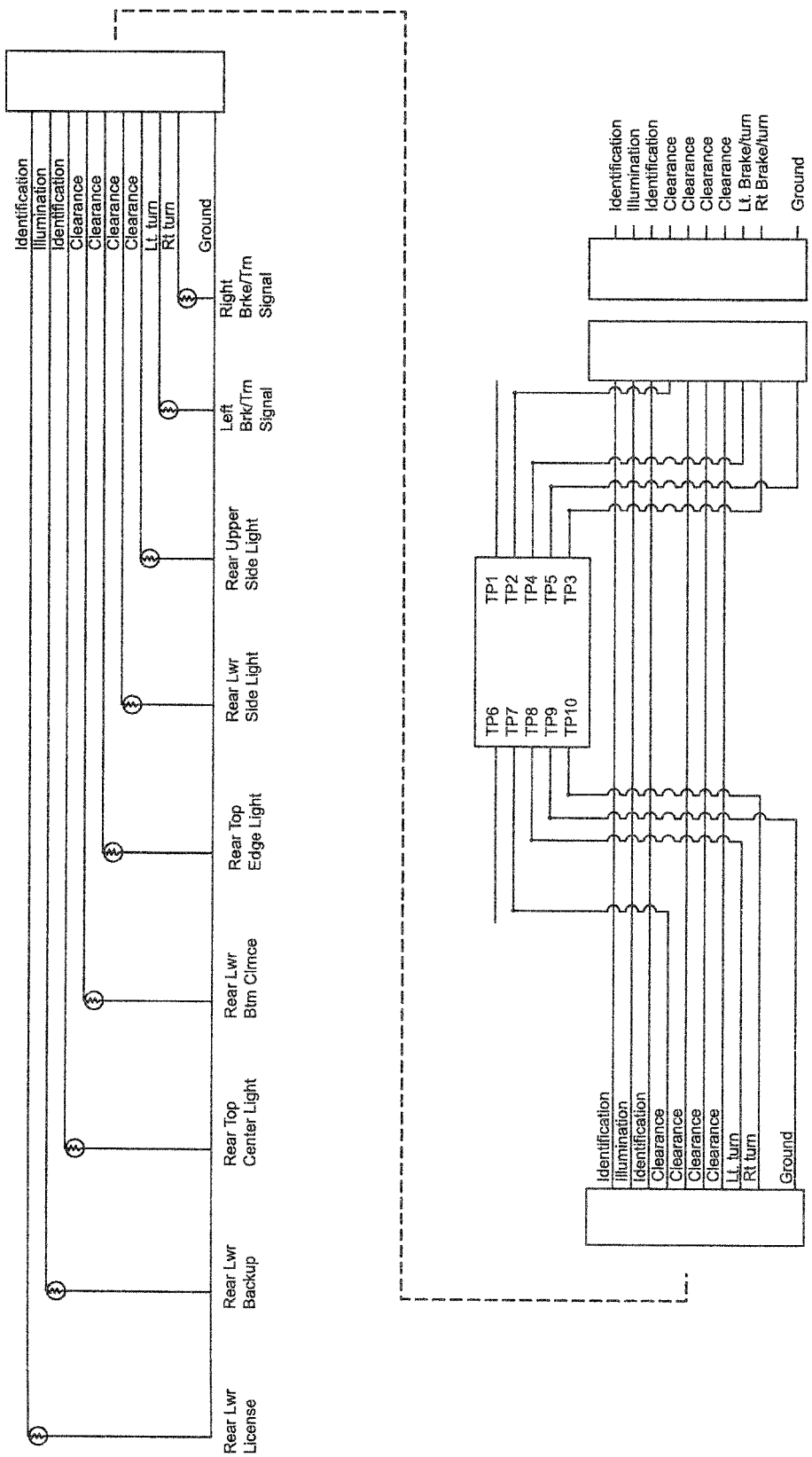
FIG. 7 shows the straight truck light controller installed in the box wiring diagram for flashing the rear lower bottom clearance light.

FIG. 7 shows the installation of the signal controller 400 in the box wiring harness 300 for flashing the Box Rear Left Stop/Tail/Turn/Hazard Warning Lamp 68, the Box Rear Right Stop/Tail/Turn/Hazard Warning Lamps 69, and also flashing the rear lower bottom clearance light 66.

Figure 8:
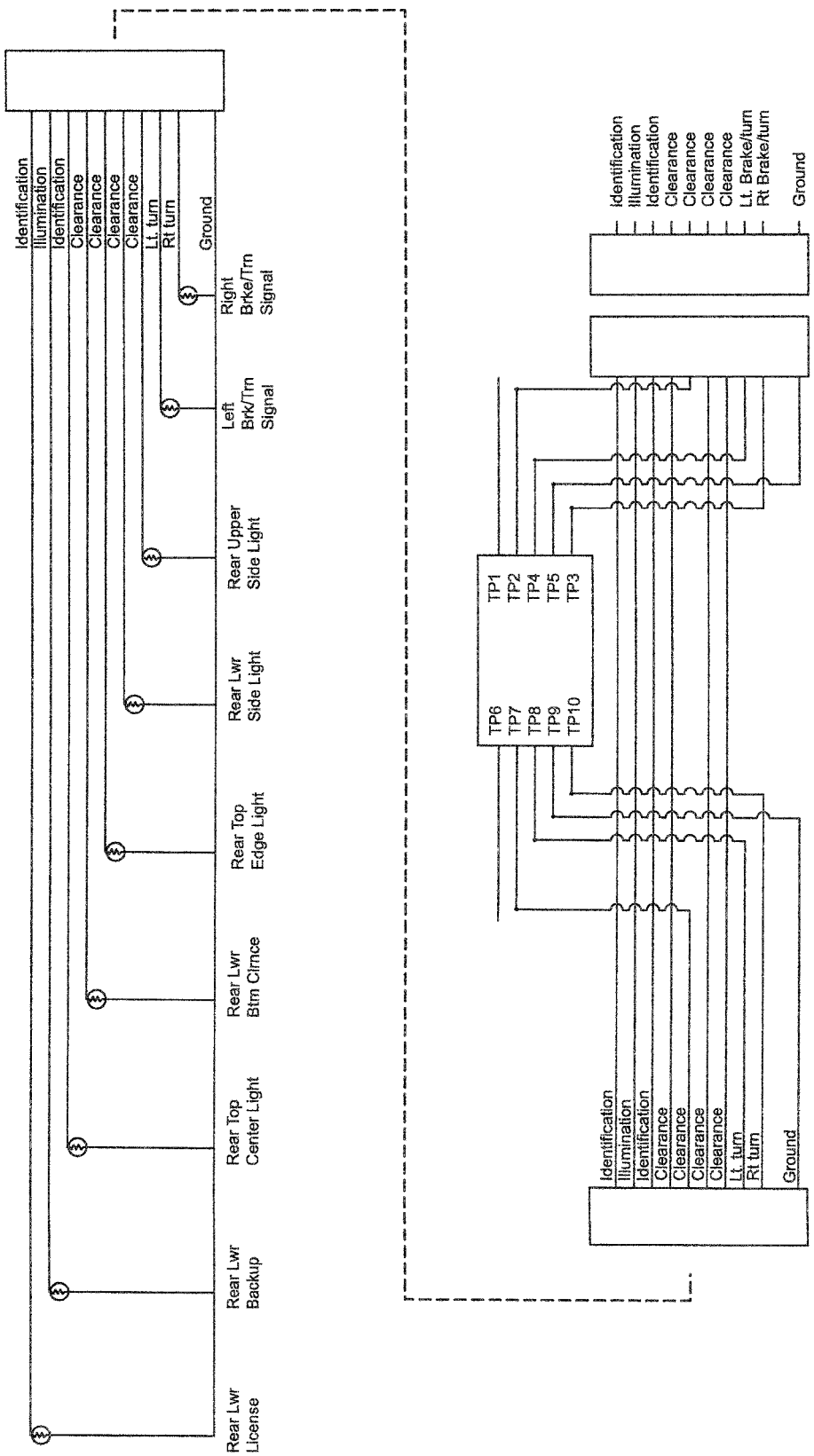
FIG. 8 shows the straight truck light controller installed in the box wiring diagram for flashing the rear top edge clearance light.

FIG. 8 shows the installation of the signal controller 400 in the box wiring harness 300 for flashing the Box Rear Left Stop/Tail/Turn/Hazard Warning Lamp 68, the Box Rear Right Stop/Tail/Turn/Hazard Warning Lamps 69, and also flashing the rear top edge light 56.

Figure 9:
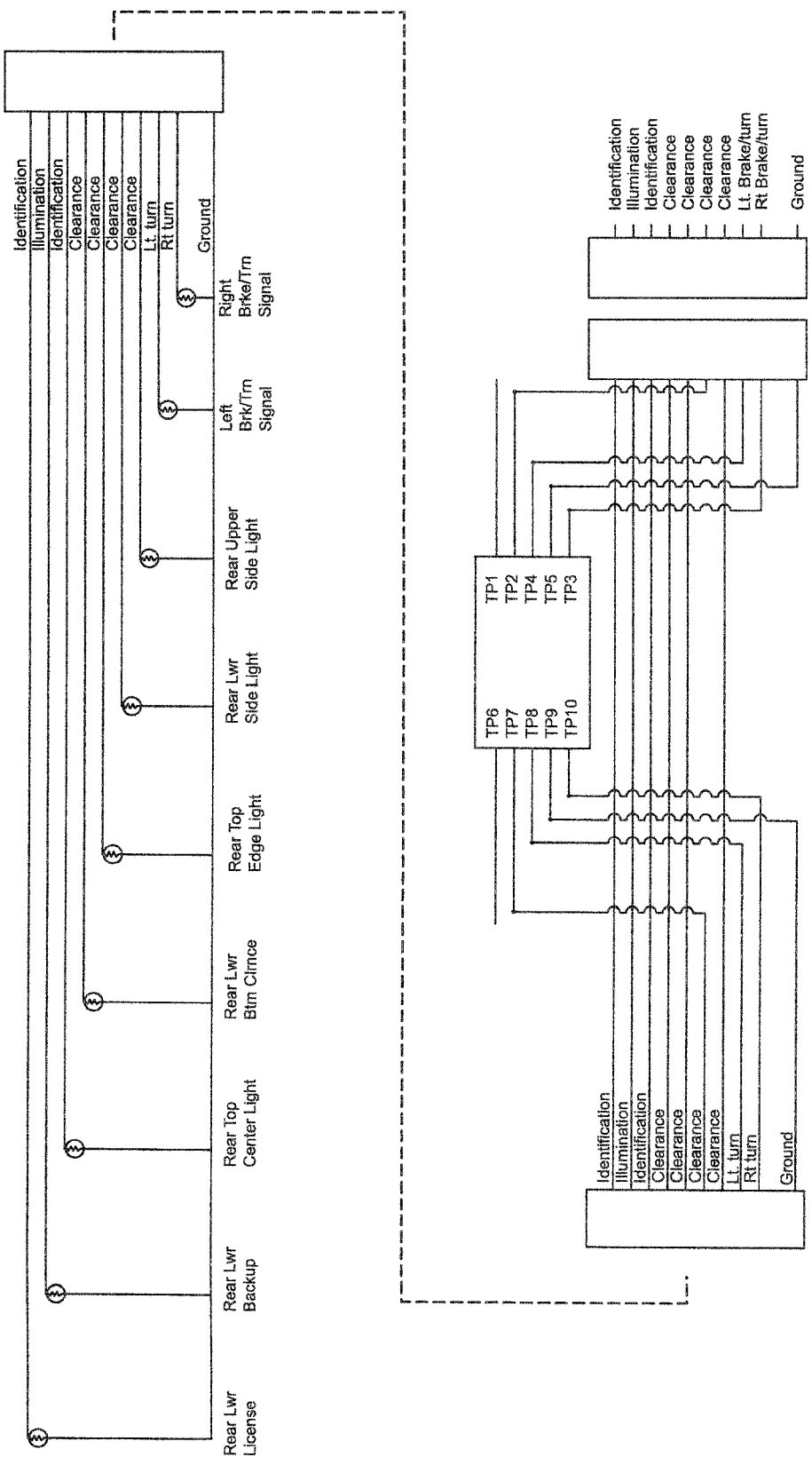
FIG. 9 shows the straight truck light controller installed in the box wiring diagram for flashing the rear lower side clearance light.

FIG. 9 shows the installation of the signal controller 400 in the box wiring harness 300 for flashing the Box Rear Left Stop/Tail/Turn/Hazard Warning Lamp 68, the Box Rear Right Stop/Tail/Turn/Hazard Warning Lamps 69, and also flashing the rear lower side light 60.

Figure 10:
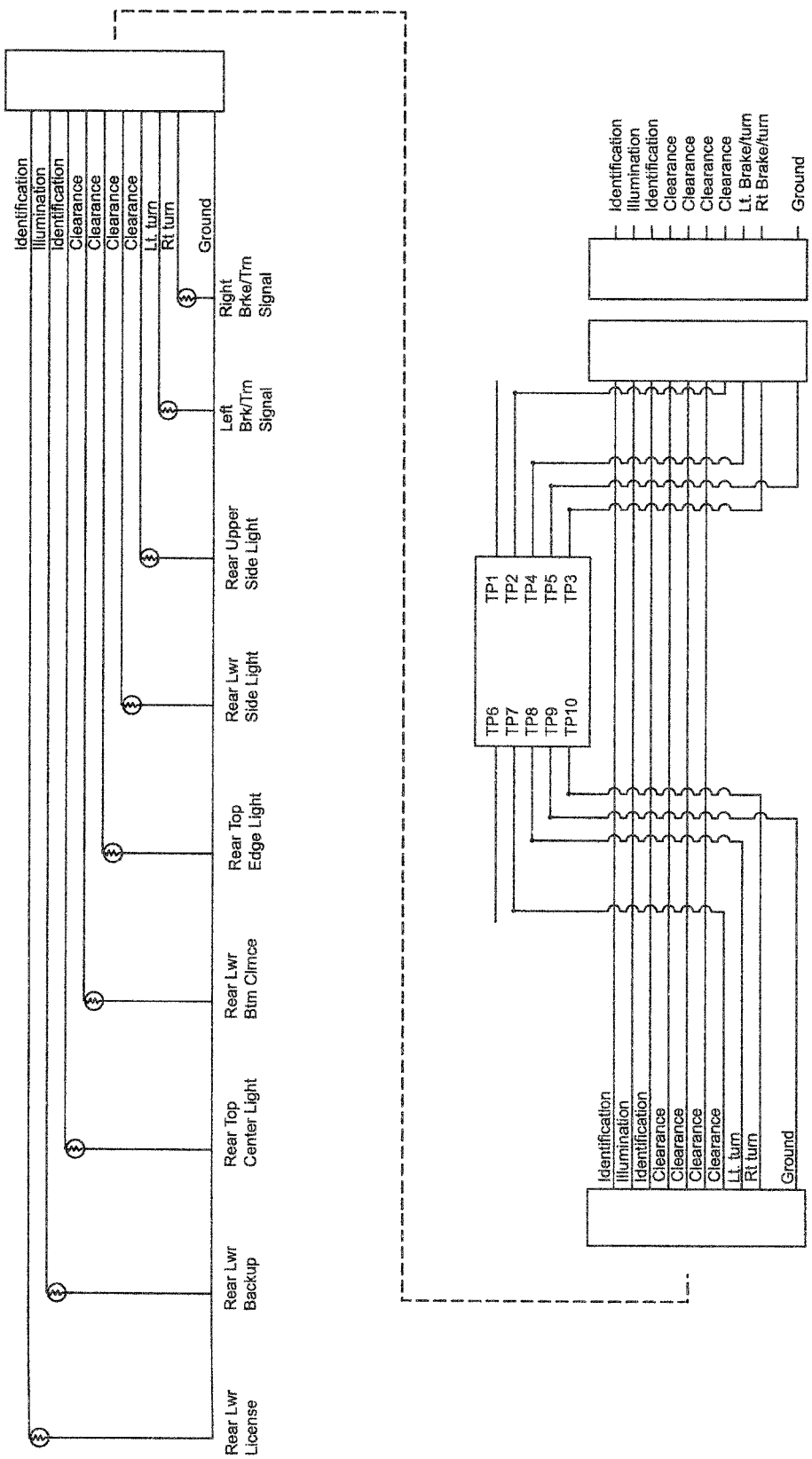
FIG. 10 shows the straight truck light controller installed in the box wiring diagram for flashing the rear upper side clearance light.

FIG. 10 shows the installation of the signal controller 400 in the box wiring harness 300 for flashing the Box Rear Left Stop/Tail/Turn/Hazard Warning Lamp 68, the Box Rear Right Stop/Tail/Turn/Hazard Warning Lamps 69, and also flashing the rear upper side light 54.

Figure 11:
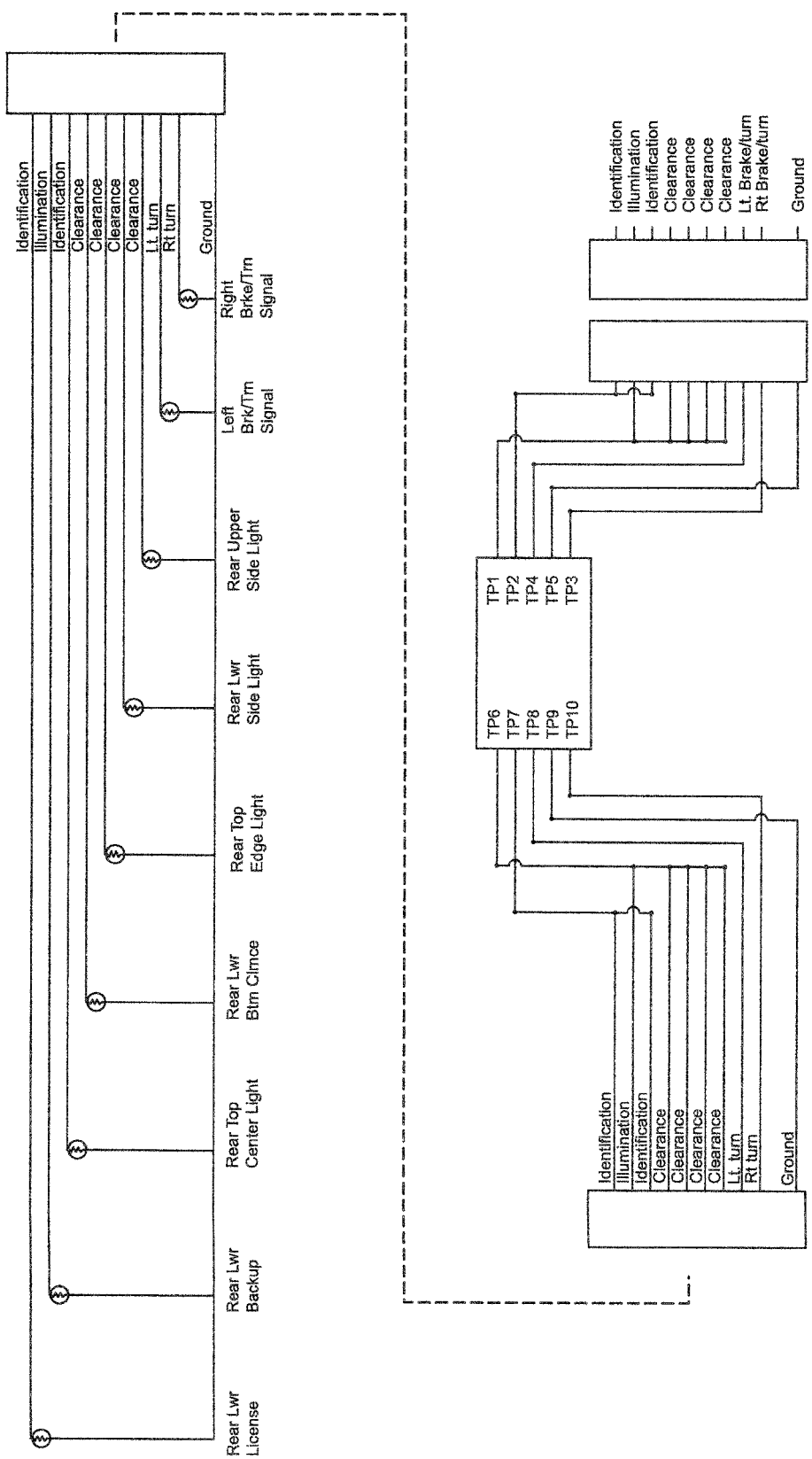
FIG. 11 shows the straight truck light controller installed in the box wiring diagram for flashing the identification lights.

FIG. 11 shows the installation of the signal controller 400 in the box wiring harness 300 for flashing the Box Rear Left Stop/Tail/Turn/Hazard Warning Lamp 68, the Box Rear Right Stop/Tail/Turn/Hazard Warning Lamps 69, and also flashing the identification lamps 320.

Figure 12:
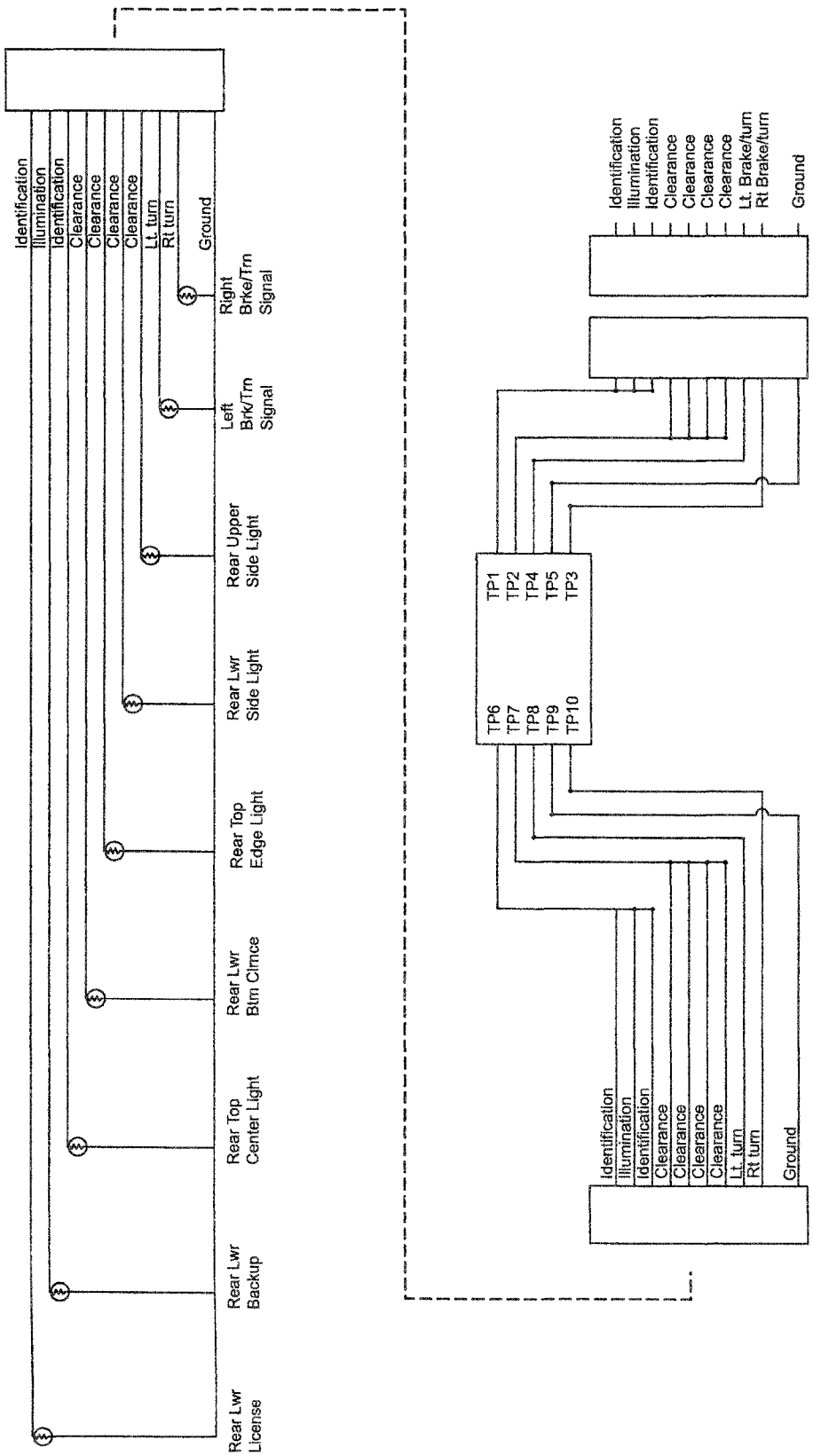
FIG. 12 shows the straight truck light controller installed in the box wiring diagram for flashing the clearance lights.

FIG. 12 shows the installation of the signal controller 400 in the box wiring harness 300 for flashing the Box Rear Left Stop/Tail/Turn/Hazard Warning Lamp 68, the Box Rear Right Stop/Tail/Turn/Hazard Warning Lamps 69, and also flashing the clearance lamps 310.

Figure 13:
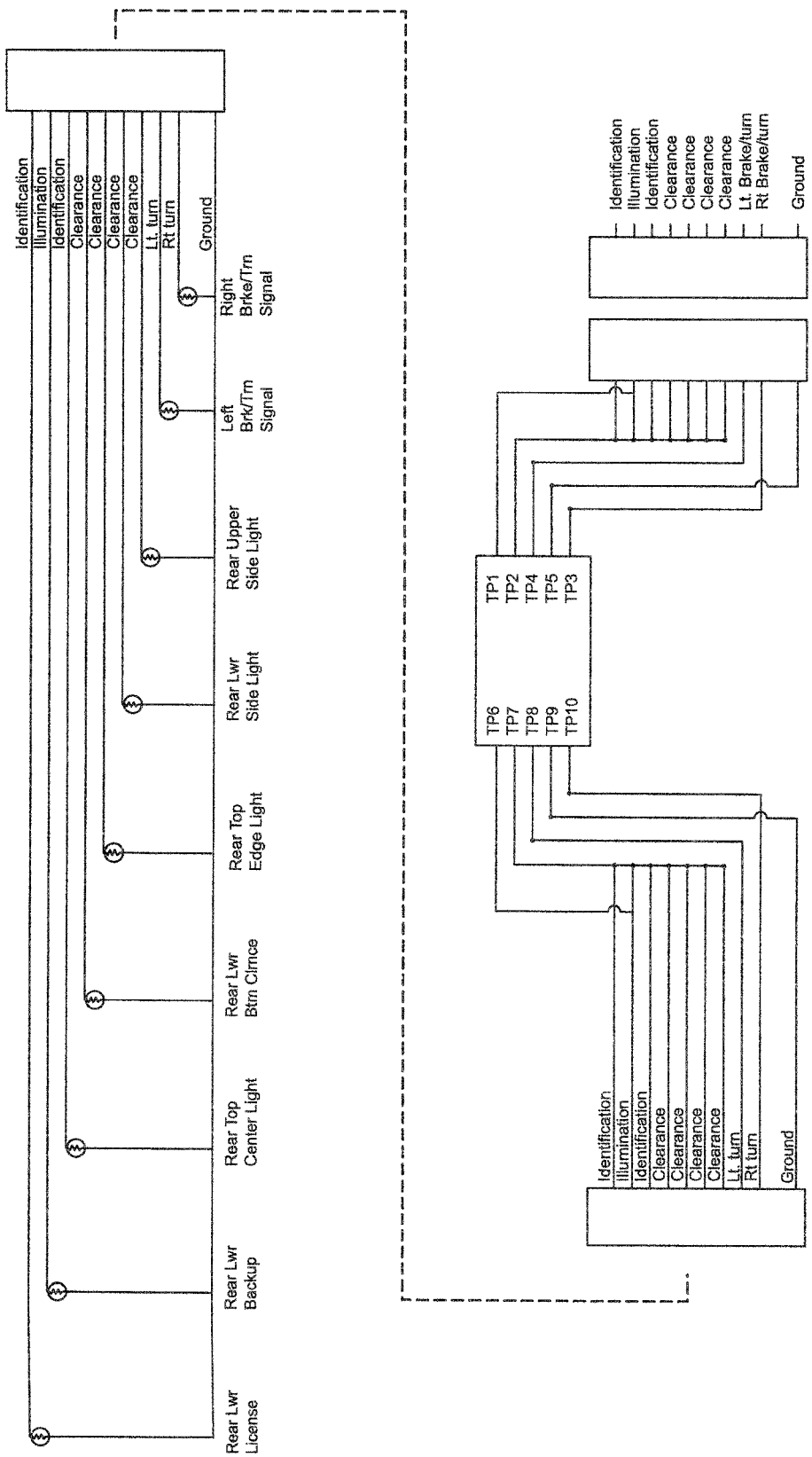
FIG. 13 shows the straight truck light controller installed in the box wiring diagram for flashing both the identification and clearance lights.
Figure 14:
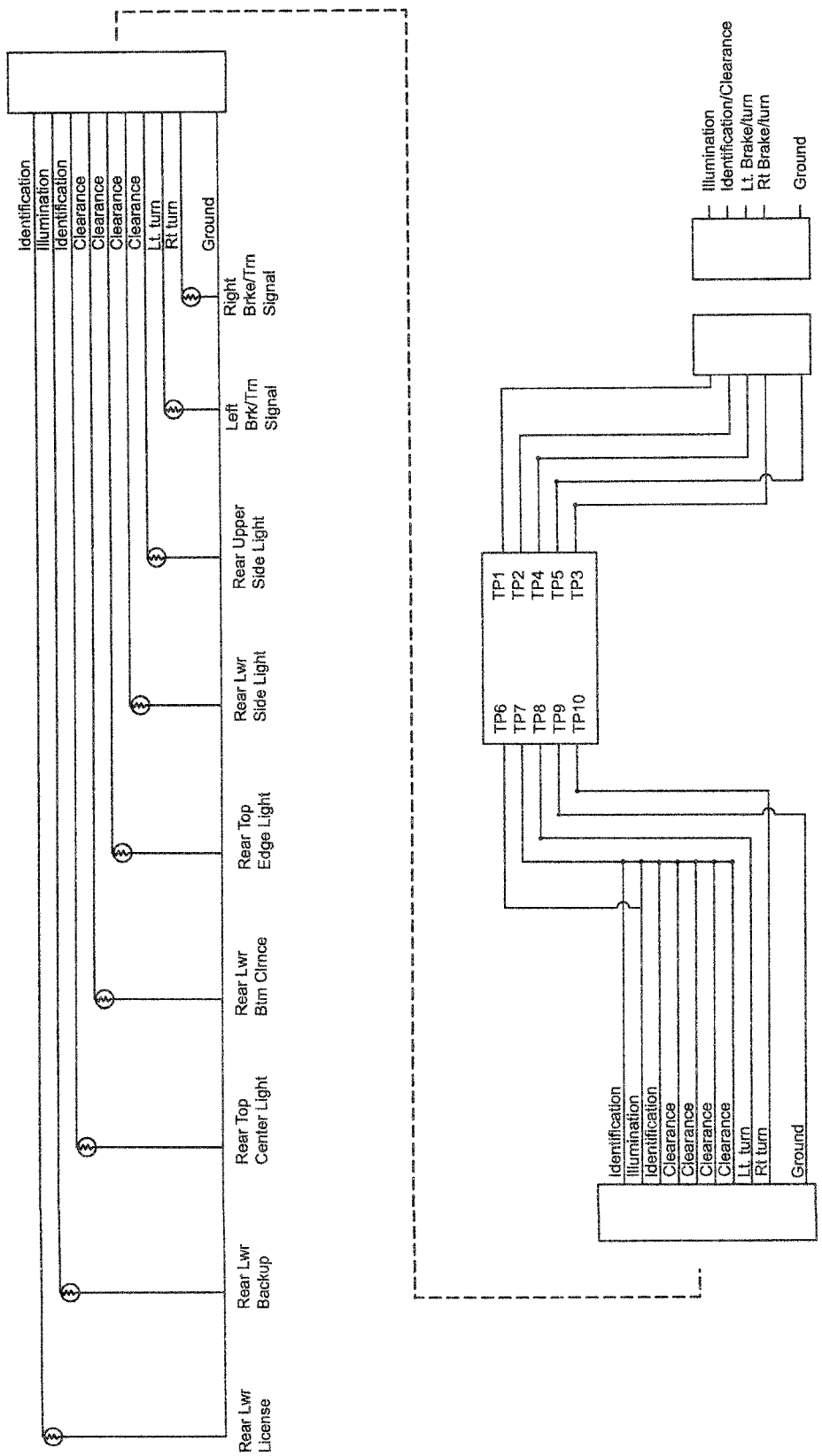
FIG. 14 shows the straight truck light controller installed in the box wiring diagram for flashing both the identification and clearance lights in a ten pin box wiring harness to connect to a mating five pin connector on the truck wiring harness.
Figure 15:
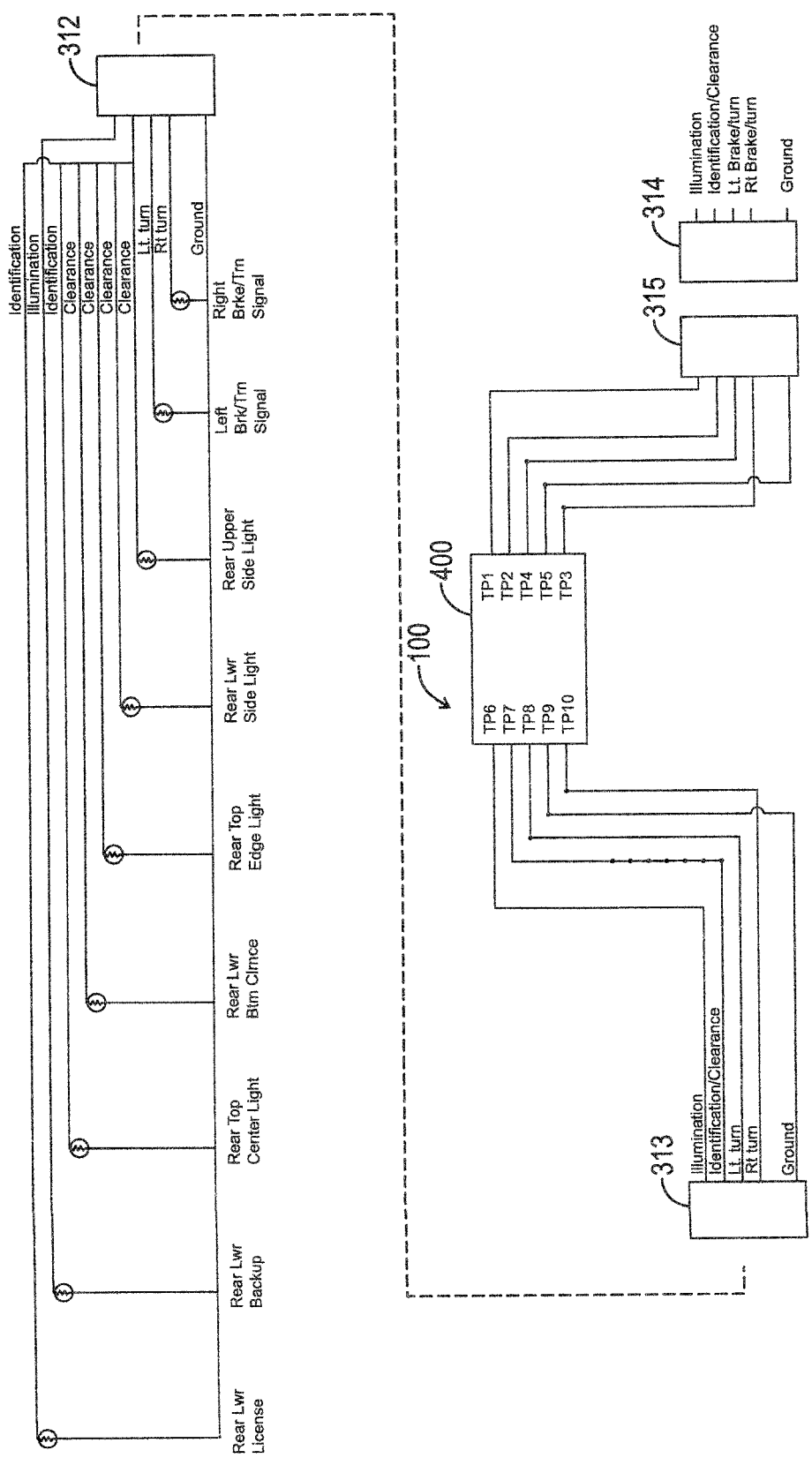
FIG. 15 shows the straight truck light controller installed in the box wiring diagram for flashing both the identification and clearance lights in a box wiring harness with a five pin connector harness to connect to a mating five pin connector on the truck wiring harness.

FIG. 13 shows the installation of the signal controller 400 in the box wiring harness 300 for flashing the Box Rear Left Stop/Tail/Turn/Hazard Warning Lamp 68, the Box Rear Right Stop/Tail/Turn/Hazard Warning Lamps 69, and also flashing both the clearance lamps 310 and the identification lamps 320.

FIG. 13 shows the installation of the signal controller 400 in the box wiring harness 300 using a five pin connector for flashing the Box Rear Left Stop/Tail/Turn/Hazard Warning Lamp 68, the Box Rear Right Stop/Tail/Turn/Hazard Warning Lamps 69, and also flashing both the clearance lamps 310 and the identification lamps 320.

Figure 16:
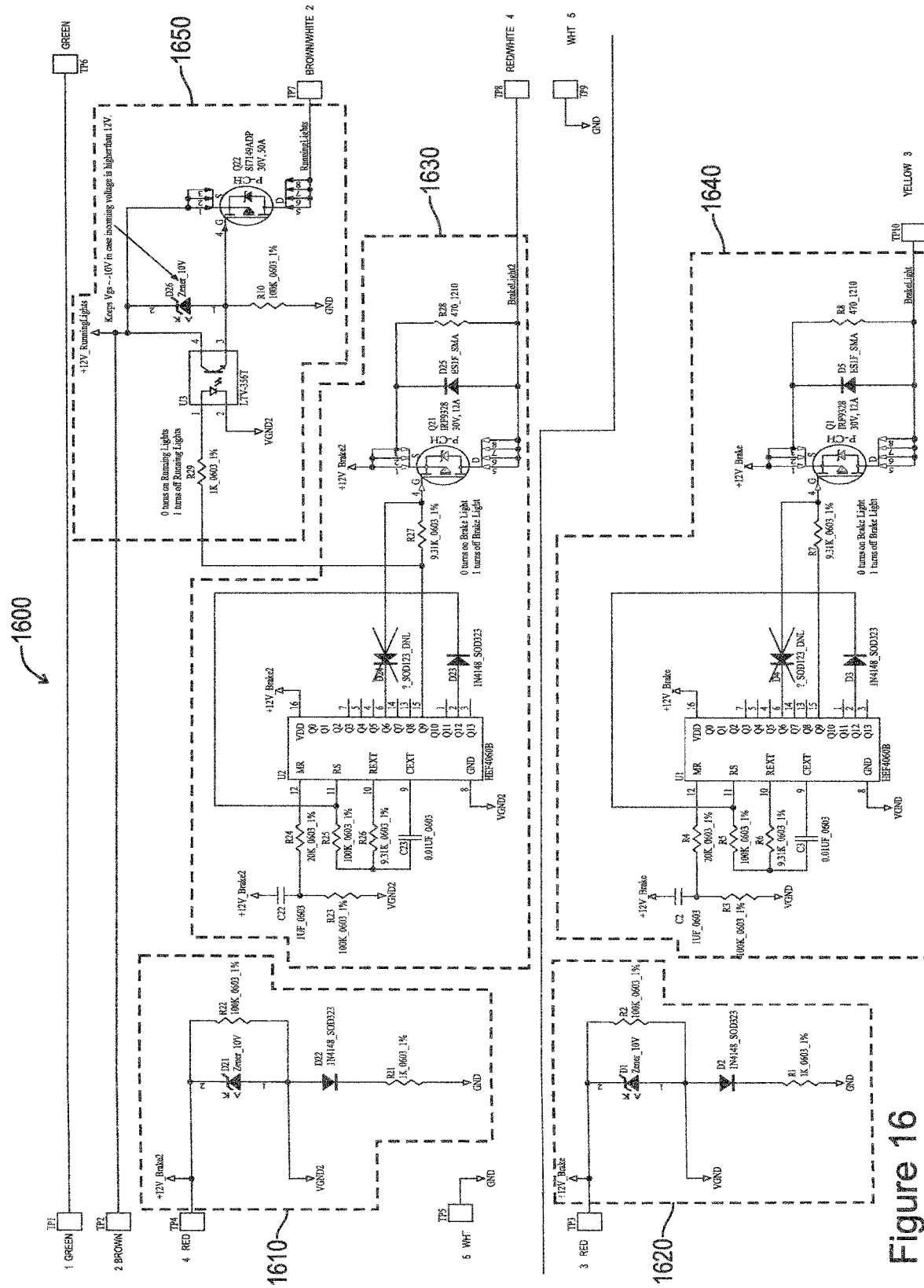
FIG. 16 shows the electrical schematic including the voltage limiting sections, left brake signal control section, right brake signal control section and secondary light flashing section providing both flashing and return to secondary function.
Figure 17:
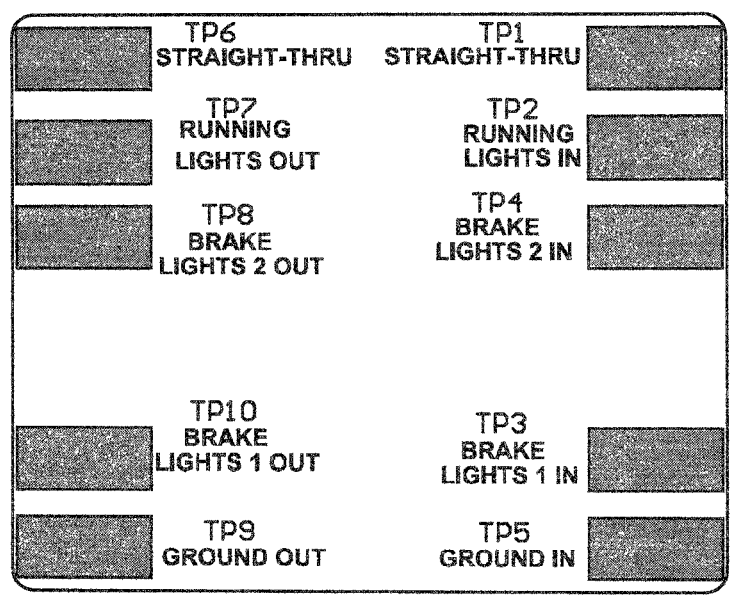
FIG. 17 shows the terminal connectors on the circuit board with input connectors on one side and output connectors on the opposite side for a pass through circuit construction.
Figure 18:
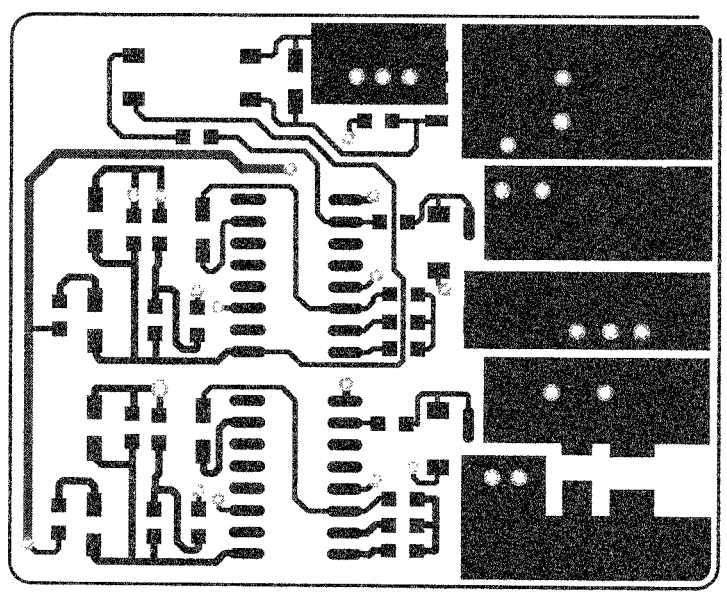
FIG. 18 shows the chip side circuit traces.
Figure 19:
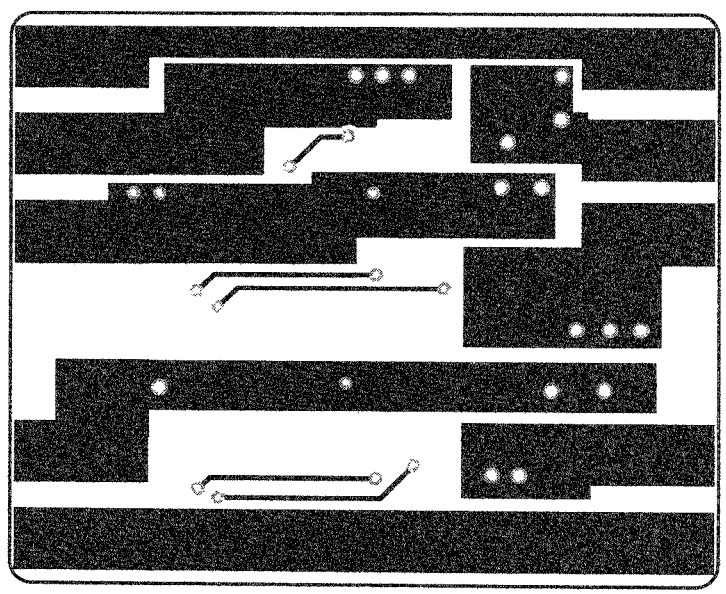
FIG. 19 shows the connection side traces.
Figure 20:
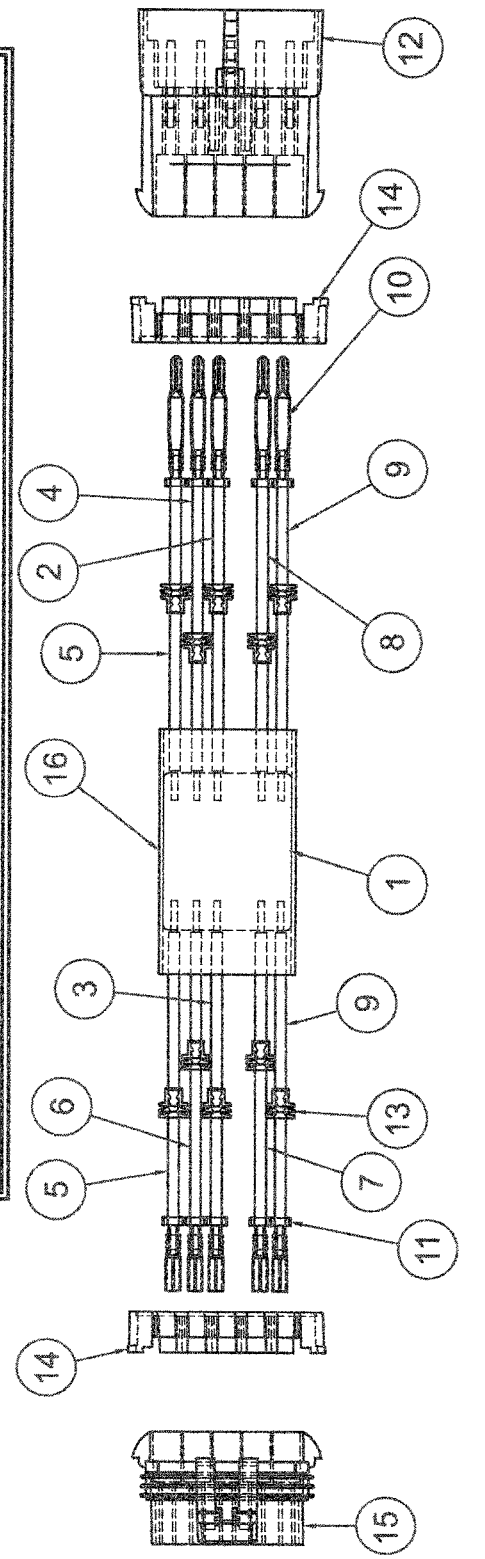
FIG. 20 shows the physical construction of a five pin input to five pin output boxtail.

FIG. 16 shows the electrical circuit diagram with voltage limiting sections 1610, 1620, brake/turn signal control sections 1630, 1640, and other light signal control section 1650.

Voltage limiting sections 1610, 1620 are simply a voltage protection circuit between TP4 and TP5, or TP3 and TP5 providing a variable ground signal VGND for protection of the circuitry by limiting voltage using a Zener Diode D1, D21.

Brake signal control sections 1630, 1640, use a HEF4060B integrated circuit available from NEXPERIA, Jonkerbosplein 52, 6534 AB Nijmegen, The Netherlands. The HEF4060B is a 14-stage ripple-carry binary counter/divider and oscillator with three oscillator terminals (RS, REXT and CEXT), ten buffered outputs (Q3 to Q9 and Q11 to Q13) and an overriding asynchronous master reset input (MR). Basically this changes the input brake signal at the MR terminal 12 to a pulsed output at Q9 terminal 15 for a fixed number of flashes, three to five is usually sufficient, before turning to a solid non flashing burn of the light. Here Q9, terminal 15 provides a pulsed brake light output signal through a power MOSFET IRF9328, available from International Rectifier 233 Kansas St., El Segundo, California 90245, to TP5 or TP10 for the appropriate left or right brake light signal output.

Other function light signal control section 1650 uses the signal at Q9, terminal 15 to also provide a pulsed running output signal through an Optoisolator LTV-356T to a power MOSFET, S17149ADP available from Vishay Siliconix, 2585 Junction Ave, San Jose, CA 95134, to TP7 for the other function light such as the clearance lights, identification lights, and illumination lights. In this manner, both the left and right stop/turn/tail/hazard lights and the other function lights can be flash controlled using the onset of the brake signal. Because the other function lights are controlled in their normal function by the input at TP2, and the number of flashes is controlled by the activation of the counter upon detection of a braking signal, they act as both their original function and also act as a flashing brake indicator at the initial detection of the brake signal. Thus they act in their normal mode, flash when a brake signal is initially detected for a number of counts, and then return to their non-brake light normal operating mode after the set number of flashes.

Reference numerals used throughout the detailed description and the drawings correspond to the following elements:
truck chassis 10
truck box 20
straight truck 30
Truck Front Headlamp-Lower Beam 32
Truck Front Headlamp-Upper Beam 34
Truck Front Daytime Running Lamps/Parking Lamps 36
Truck Front Left/Right Turn Signals 40
Truck Front Hazard Warning Lamps 41
Truck Front Lower Side Marker Lamps 42
Truck Front Top Edge Clearance Lamps 44
Box Front Top Center Identification Lamps 46
Box Front Top Edge Clearance Lamps 48
Box Top Intermediate Side Lamps 50
Box Lower Intermediate Side Lamps 52
rear upper side light 54
rear top edge light 56
rear top center identification lamps 58
rear lower side light 60
rear lower backup lamp 62
rear lower license light 64
rear lower bottom clearance light 66
Box Rear Left Stop/Tail/Turn/Hazard Warning Lamp 68
Box Rear Right Stop/Tail/Turn/Hazard Warning Lamps 69
straight-truck box-light controller boxtail 100
box wiring harness 300
ten pin box side connector 302
ten pin box output connector 303
ten pin truck connector 304
ten pin box input connector 305
clearance lamps 310
identification lamps 320
illumination lamp 330
electrical flashing control circuit 400
five pin box side connector 312
five pin box output connector 313
five pin truck connector 314
five pin box input connector 315
boxtail electrical circuit 1600
first voltage limiting section 1610
second voltage limiting section 1620
first brake/turn signal control section 1630
second brake/turn signal control section 1640
other light signal control section 1650
Input side first terminal point TP1
Input side second terminal point TP2
Input side third terminal point TP3
Input side fourth terminal point TP4
Input side Fifth terminal point TP5
Output side sixth terminal point TP6
Output side seventh terminal point TP7
Output side eighth terminal point TP8
Output side ninth terminal point TP9
Output side tenth terminal point TP10
variable ground signal VGND
first Zener Diode D1 second Zener Diode D21
ripple-carry binary counter/divider and oscillator HEF4060B
oscillator terminal RS
oscillator terminal REXT
oscillator terminal CEXT
ten buffered outputs Q3, Q4, Q5, Q6, Q&, Q8, Q9, Q11, Q12, Q13
asynchronous master reset input MR
power MOSFET IRF9328
Optoisolator LTV-356T
power MOSFET S17149ADP From the foregoing, it will be seen that this invention well adapted to obtain all the ends and objects herein set forth, together with other advantages which are inherent to the structure. It will also be understood that certain features and subcombinations are of utility and may be employed without reference to other features and subcombinations. This is contemplated by and is within the scope of the claims. Many possible embodiments may be made of the invention without departing from the scope thereof. Therefore, it is to be understood that all matter herein set forth or shown in the accompanying drawings is to be interpreted as illustrative and not in a limiting sense.

When interpreting the claims of this application, method claims may be recognized by the explicit use of the word 'method' in the preamble of the claims and the use of the 'ing' tense of the active word. Method claims should not be interpreted to have particular steps in a particular order unless the claim element specifically refers to a previous element, a previous action, or the result of a previous action. Apparatus claims may be recognized by the use of the word 'apparatus' in the preamble of the claim and should not be interpreted to have 'means plus function language' unless the word 'means' is specifically used in the claim element. The words 'defining,' 'having,' or 'including' should be interpreted as open ended claim language that allows additional elements or structures. Finally, where the claims recite "a" or "a first" element of the equivalent thereof, such claims should be understood to include incorporation of one or more such elements, neither requiring nor excluding two or more such elements.

What is claimed is:

1. An improved truck box braking notification system apparatus for a vehicle sending a brake signal with a voltage to a truck box, the truck box including brake lights and identification lights, the improved truck box braking notification system apparatus comprising:
   an electrical circuit including a control signal detection sensor receiving the brake signal, a flashing light control circuit flashing the brake lights between a bright burn and a dim burn, and a flashing an other light control circuit;
   the other light control circuit electrically connected to the identification lights, wherein the flashing other light control circuit reduces the voltage and thereby flashes the truck box identification lights and then returns returning to a continuous state upon detection of the brake signal by the control signal detection sensor.

2. The improved truck box braking notification system apparatus of claim 1, the truck box further including clearance lights, the improved truck box braking notification system apparatus further comprising:
   the other light control circuit electrically connected to the clearance lights, wherein the other light control circuit flashes the clearance lights upon detection of the brake signal by the control signal detection sensor.

3. The improved truck box braking notification system apparatus of claim 2, the truck box including marker lights including an illumination light, the improved truck box braking notification system apparatus further comprising:
   the other light control circuit electrically connected to the illumination light, wherein the other light control circuit flashes the illumination light upon detection of the brake signal by the control signal detection sensor.

4. The improved truck box braking notification system apparatus of claim 3, the improved truck box braking notification system apparatus further comprising:
   the flashing light control circuit electrically connected to the brake lights, wherein the flashing light control circuit also flashes the brake lights upon detection of the brake signal by the control signal detection sensor and then returns returning to a continuous state.

5. The improved truck box braking notification system apparatus of claim 2, the improved truck box braking notification system apparatus further comprising:
   the flashing light control circuit electrically connected to the brake lights, wherein the flashing light control circuit also flashes the brake lights upon detection of the brake signal by the control signal detection sensor and then returns returning to a continuous state.

6. The improved truck box braking notification system apparatus of claim 1, the truck box including marker lights including an illumination light, the improved truck box braking notification system apparatus further comprising:
   the other light control circuit electrically connected to the illumination light, wherein the other light control circuit flashes the illumination light upon detection of the brake signal by the control signal detection sensor.

7. The improved truck box braking notification system apparatus of claim 6, the improved truck box braking notification system apparatus further comprising:
   the flashing light control circuit electrically connected to the brake lights, wherein the flashing light control circuit also flashes the brake lights upon detection of the brake signal by the control signal detection sensor and then returns returning to a continuous state.

8. The improved truck box braking notification system apparatus of claim 1, the improved truck box braking notification system apparatus further comprising:
   the flashing light control circuit electrically connected to the brake lights, wherein the flashing light control circuit also flashes the brake lights upon detection of the brake signal by the control signal detection sensor and then returns returning to a continuous state.

9. The improved truck box braking notification system apparatus of claim 1, further comprising:
   the identification light including a box rear upper center identification light.

10. The improved truck box braking notification system apparatus of claim 1, further comprising:
    the identification light including a box rear license plate light.

11. An improved truck box braking notification system apparatus for a vehicle sending a brake signal with a voltage to a truck box, the truck box including brake lights and clearance lights, the improved truck box braking notification system apparatus comprising:
    an electrical circuit including a control signal detection sensor receiving the brake signal and an other light circuit;
    the other light circuit electrically connected to the clearance lights, wherein the other flashing control circuit reduces the voltage and thereby flashes the clearance lights and then returns returning to a continuous state upon detection of the brake signal by the control signal detection sensor upon detection of the brake signal by the control signal detection sensor.

12. The improved truck box braking notification system apparatus of claim 11, the truck box further including illumination lights, the improved truck box braking notification system apparatus further comprising:
the other light control circuit electrically connected to the truck box turn signal indicator lights, wherein the flashing light control circuit flashes the truck box turn signal indicator lights upon detection of the brake signal by the control signal detection sensor.

13. The improved truck box braking notification system apparatus of claim 12, the improved truck box braking notification system apparatus further comprising:
the flashing light control circuit electrically connected to the brake lights, wherein the flashing light control circuit also flashes the brake lights upon detection of the brake signal by the control signal detection sensor and then returns returning to a continuous state.

14. The improved truck box braking notification system apparatus of claim 11, the improved truck box braking notification system apparatus further comprising:
the flashing light control circuit electrically connected to the brake lights, wherein the flashing light control circuit also flashes the brake lights upon detection of the brake signal by the control signal detection sensor and then returns returning to a continuous state.

15. The improved truck box braking notification system apparatus of claim 11, further comprising:
the clearance light including a box rear upper side edge clearance light.

16. The improved truck box braking notification system apparatus of claim 11, further comprising:
the clearance light including a box rear upper top edge clearance light.

17. The improved truck box braking notification system apparatus of claim 11, further comprising:
the clearance light including a box rear lower side edge clearance light.

18. The improved truck box braking notification system apparatus of claim 11, further comprising:
the clearance light including a box rear lower back bottom edge clearance light.

19. An improved truck box braking notification system apparatus for a vehicle sending a brake signal with a voltage to a truck box, the truck box including brake lights and illumination lights, the improved truck box braking notification system apparatus comprising:
an electrical circuit including a control signal detection sensor receiving the brake signal, and
an other light control circuit; the other light control circuit electrically connected to the illumination lights, wherein the other light control circuit reduces the voltage and thereby flashes the illumination lights and then returns returning to a continuous, state upon detection of the brake signal by the control signal detection sensor.

20. The improved truck box braking notification system apparatus of claim 19, the improved truck box braking notification system apparatus further comprising:
the flashing light control circuit electrically connected to the brake lights, wherein the flashing light control circuit also flashes the brake lights upon detection of the brake signal by the control signal detection sensor and then returns returning to a continuous state.

21. The improved truck box braking notification system apparatus of claim 19, further comprising:
the illumination light including a box rear back-up light.

* * * * *